Figure 1:
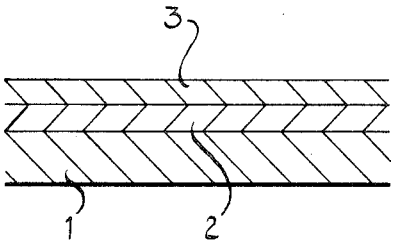
Figure 2:
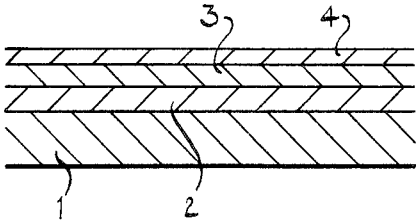
Figure 3:
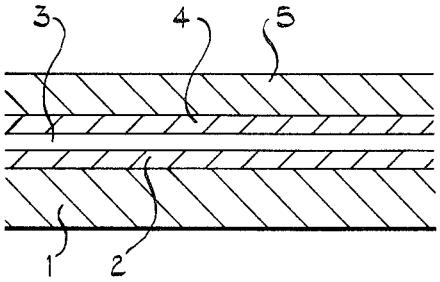

United States Defensive Publication [19] (H) [11] T990,001

Huffey et al. [43] Jan. 1, 1980

[54] LIGHT-SENSITIVE VESICULAR IMAGING MATERIALS

[75] Inventors: Roy F. Huffey, Ipswich; David E. Lothian, Colchester; Stuart C. Rennison, Hadleigh; Michael K. Titman, Colchester, all of England

[73] Assignee: Bedford Limited, London, England

[21] Appl. No.: 37,513

[22] Filed: May 9, 1979

Related U.S. Application Data

[63] Continuation of Ser. No. 922,162, Jul. 5, 1978, abandoned, which is a continuation-in-part of Ser. No. 843,931, Oct. 18, 1977, abandoned.

[30] Foreign Application Priority Data

Jul. 7, 1977 [GB] United Kingdom ..... 28531/77

[51] Int. Cl.[2] ..... G03C 1/80; G03C 1/54

[52] U.S. Cl. ..... 430/162; 430/152; 430/273; 430/290; 430/292

[57] ABSTRACT

Light-sensitive vesicular imaging materials, suitable for the production of colored labels, etc., comprise a light-sensitive vesicular imaging layer applied to one surface of a transparent self-supporting plastics sheet or film such as a linear polyester, e.g. polyethylene terephthalate film, said light-sensitive vesicular imaging layer comprising a polymeric vehicle having uniformly dispersed therein a sensitizing agent which releases a vesicle-forming gas, preferably nitrogen, upon exposure to light and optionally including a pigment or dye, said polymeric vehicle comprising a thermoplastic polymer having a nitrogen permeability constant in the range $1\times10^{-15}$ to $1\times10^{-10}$ and being softenable upon heating above ambient temperature to permit the gas released by the sensitizing agent in the light-struck areas to form an image in the form of light-scattering or reflecting vesicles therein, wherein at least one pigmented or dyed coating layer which includes a polymeric binder and has an opacity represented by a total luminous transmittance measured by ASTM test method D-1003-61 not exceeding 25% is applied over the vesicular imaging layer and remote from the plastics sheet or film and provides a contrasting background for the image. The pigmented or dyed layer may optionally contain a self-adhesive or pressure-sensitive adhesive for affixing the material to a receptive substrate. Alternatively a separate self-adhesive or pressure-sensitive adhesive layer may be applied to the pigmented or dyed layer, optionally protected by a peelable backing layer.

10 Claims, 1 Sheet Drawing,

17 Pages Specification

The file of this unexamined application may be inspected and copies thereof may be purchased (849 O.G. 1221, Apr. 9, 1968).